July 8, 1952 J. W. CROKER 2,602,234

INSIDE MICROMETER

Filed Oct. 27, 1945

Inventor
John W. Croker
By Philip A. Friedell
Attorney

Patented July 8, 1952 2,602,234

UNITED STATES PATENT OFFICE 2,602,234

INSIDE MICROMETER

John W. Croker, Alameda, Calif.

Application October 27, 1945, Serial No. 624,963

1 Claim. (Cl. 33—164)

1

This invention, an inside micrometer, is an improvement over conventional types of micrometers in that it is capable of measurements far below that possible with any other type of inside micrometer. The conventional inside micrometer is limited to a minimum of about one-and-a-half inches while with my new type it is possible to measure inside diameters as little as three-eighths of an inch and even slightly less.

The conventional inside micrometer has its adjustment in line with the axis of the gauging members so that adjustment during measurements must be made through relative rotation of the respective parts on an axis at right angles to the axis of the bore or recess being measured, which means that the fingers of the operator must be extended into the bore to operate the micrometer, or wrench elements must be used for reciprocal action externally, while with my new type adjustment is at right angles to the gauging members and parallel with the axis of the bore. For this reason, instead of being limited to measurements close to the outer end of the bore or recess, my micrometer is capable of measuring just as accurately at any desired depth depending on the length of the shank or handle.

The invention can be made in any desired size, for measurement of any space ranging from below three-eighths of an inch, with each size capable of measuring different sizes of bores through a considerable range by changing the gauge blocks which are quickly and easily interchanged.

The objects and advantages of the invention are as follows:

First, to provide an inside micrometer which can be made in sizes to measure any desired width of opening down to a minimum of slightly less than three-eighths of an inch.

Second, to provide an inside micrometer with which exceptionally narrow spans can be accurately measured as to diameters, and below the range of conventional micrometers.

Third, to provide an inside micrometer with interchangeable gauge members for increasing the range of the micrometer.

Fourth, to provide an inside micrometer in which the adjusting spindle axis is at right angles to the axis of the gauging members whereby adjustment is easily and conveniently carried out, and measurements can be made at considerable depths.

Fifth, to provide an inside micrometer of the utmost accuracy, relatively simple in construction, and conveniently operated.

2

In describing the invention reference will be made to the accompanying drawings, in which.

Figures 1, 2, 3, 4, 5, 6, 7:
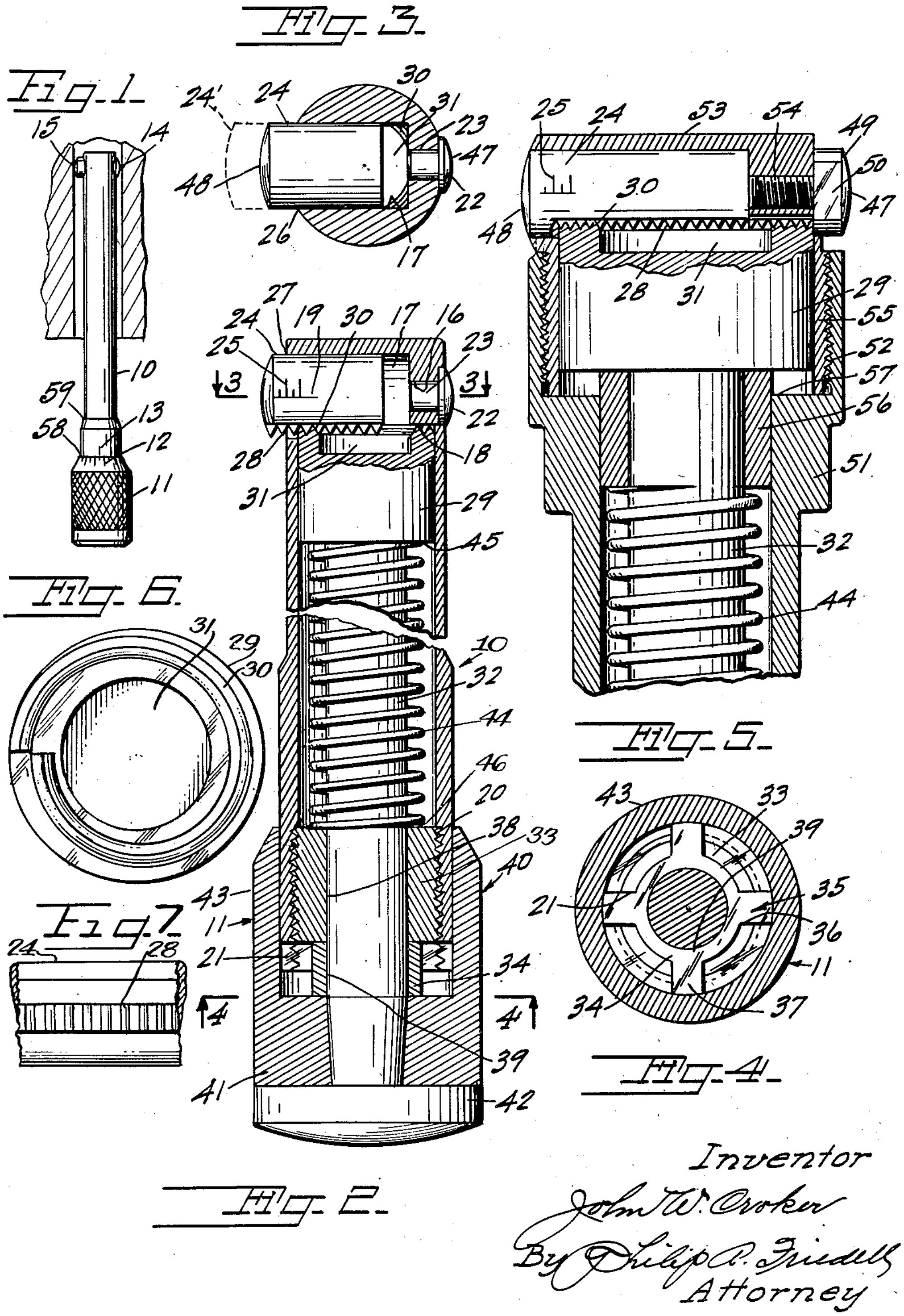
Fig. 1 is a side elevation of the invention shown in position for measuring the diameter of a bore at considerable depth, and illustrates the actual size of substantially the smallest type which is capable of measuring bores to a minimum of slightly below three-eighths inch.
Fig. 2 is a greatly enlarged broken section through the invention.
Fig. 3 is a section taken on line 3—3 of Fig. 2, but with the gauging members shown solid.
Fig. 4 is a section taken on line 4—4 of Fig. 2.
Fig. 5 is a fragmentary section through the gauging head of a modification of the invention.
Fig. 6 is a view showing the operative face of the adjusting member with its single scroll tooth.
Fig. 7 is a fragmentary view showing the rack teeth cut in the spindle side face for cooperation with the scroll tooth.

The invention consists essentially of a sleeve 10 provided with an adjustable cap 11 provided with graduations 12 for coordination with an index 13 on the sleeve, an anvil 14, and a spindle 15 adjustable in a plane at right angles to the axis of the sleeve and coincident with the axis of the anvil, and an operative connection between the micrometer head 11 and the spindle 15.

As illustrated in Figs. 1 to 4, this invention can be made in a size as illustrated in Fig. 1 for accurately measuring very small bores or spans, even below three-eighths of an inch, which measurements heretofore have only been possible with conventional plug gages which do not establish the exact size of the bore but merely indicate by "go or no go" whether the bore is under or over size, while this invention micrometrically measures the exact diameter of these small bores or spans.

As illustrated in Figs. 1 to 4, the sleeve 10 is formed from a solid bar and is first bored transversely adjacent one end as indicated at 16 from one side of the bar and is then counterbored from the other side as indicated at 17. The bar is then bored axially from the other end down to a point 18 and thus extending into the counterbore 17 approximately one-third the distance to the axis 19 from the periphery of the counterbore, and is then internally threaded 20 at the other end, after which the end is radially slotted as indicated at 21.

The anvil 22 is formed of any suitable hard material, which may be tool steel, suitably heat treated alloy steels such as stainless steel, and for very small sizes may consist of a jewel such as diamond, bort, or sapphire, and as illustrated consists of a steel member having a shank 23 having light press fit in the bore 16 so that it can be replaced in case of wear. It can easily be driven out from the counterbore side.

Slidably and removably mounted in the counterbore 17 is the spindle 24 which is formed of hard material such as tool or alloy steel and provided with a series of major graduations 25 for coordination with an indicating edge 26 or 27 as may be found most convenient, and having teeth formed on one side as indicated at 28, with the face relatively narrow.

Slidably and rotatably mounted in the sleeve 10 is the adjusting member for the spindle and consisting of a head 29 having a scroll tooth 30 formed in an annular portion of its end face with the central portion of the end face relieved as indicated at 31, and having a shaft 32 extending beyond the end of the sleeve 10.

A thrust collar 33 is threadedly mounted in the end of the sleeve and has a counterbore to receive the collar portion 34 of the lock washer 35, and radial slots 36 for the radial arms 37 of the washer, and also has an axial bore 38 for the shaft 32. An axial bore 39 for the shaft 32 is also provided in the lock washer.

An adjusting member 40 having a head portion 41 fixed on the upper end of the shaft 32 by a cap nut 42 has a sleeve extension 43 slidable and rotatable on the upper end of the sleeve 10 and lock washer 35.

A spring 44 surrounds the shaft 32 and is under compression between the top 45 of the head 29, and bottom 46 of the thrust collar 33.

The spindle 24 can be adjusted a distance approximately one-third the diameter of the sleeve, so that with a three-eighths inch diameter sleeve, the adjustment is limited to about one-eighth of an inch. To increase the capacity, additional spindles are supplied, varying by eighth inches for this size micrometer, the extension being on the outer end as indicated by the dotted figure extension 24′, the teeth in all cases being formed throughout the same length.

When a different spindle is to be substituted, it is merely necessary to pull back on the adjusting member or cap which disengages the scroll from the teeth in the spindle, withdraw or slide the one spindle out and slide the other one in its place and release the cap. The spring 44 forces the scroll thread into engagement with the arcuate teeth 28 on the spindle. Obviously a tooth having a single turn on the end of the member 29 is desirable because no difficulty will be encountered because of differences in curvatures which would result between successive whorls simultaneously engaging with the rack.

The micrometer is arranged to clear the minimum size which it is capable of measuring, as for example, a micrometer made to measure from three-eighths inch would measure about 0.355 inch between the gauge ends 47 and 48 when the spindle was adjusted all the way back.

With the threads 28, 30 cut forty to the inch, a complete turn of the cap 40 will advance the spindle 0.025 inch so that the graduations 25 are then spaced 0.025 inch for direct observation. In the present case with a three-eighth inch micrometer, there would be four divisions only, reading to 0.100 with the cap 40 providing the additional 0.025 inch allowable. However, readings can be made directly by the cap by counting the number of turns, multiplying by 0.025 and adding the reading of 12 at the indicator 13.

The modification illustrated fragmentarily in Fig. 5 is of a more sturdy construction, suitable for sizes three-quarter inch and up and includes the spindle 24 having graduations 25 and teeth 28; a special screw-type anvil 49 having flats 50 by which it may be removed or replaced at will; an adjusting head 29 having a shaft 32 with a spring 44 surrounding the shaft.

Unlike the one previously described, the sleeve is formed in two parts, the sleeve proper 51 which is counterbored and threaded as indicated at 52, and the gauge head 53 which is bored and threaded for the shank 54 of the anvil 49, and counterbored from the other side for the spindle 24, and which gauge head has a right-angle extension 55 which is externally threaded to cooperate with the threaded counterbore in the sleeve and internally bored for sliding and rotating fit with the head 29. With this arrangement a thrust collar 56 prevents the end of the spring 44 from getting caught under the shoulder 57. The rest of the micrometer can be constructed on the same lines as that illustrated in Fig. 2. One of the reasons for this specific construction is to permit reduction in diameter of the sleeve beyond the other end of the spring, the sleeve being reduced in diameter at the point 46, Fig. 2, instead of having a thrust collar inserted at that point.

As will be noted, with this micrometer, extremely small spans or bores can be accurately measured, and can be measured at depths almost equal to the distance between the axis of the spindle and the end 58 of the adjusting cap, specifically to the point 59 of enlargement, leaving the intervening space for gripping while the cap is turned, see Fig. 1.

The micrometer should be manipulated in the same manner as is any conventional micrometer, by feeling, not by forcing, though, unlike the conventional micrometer, forcing cannot damage this instrument, because any actual forcing will cause the scroll to ride up out of the threads 28 and then snap back in the next set, with the adjustment of the cap in the same position. Thus, the cap can be turned beyond its limit, but if turned until the scroll snaps back, the exact diameter can be read just as though no forcing had taken place.

Thus an inside micrometer is provided which is capable of measuring exceptionally small spans, below anything previously anticipated, and upward to any desired limit, and one which cannot become damaged or put out of order through forcing, and in which forcing will not impair the accuracy of the reading or of the instrument.

I claim:

Operating means for an inside micrometer comprising; a housing having an axial bore formed therein from one end, and a spindle slidably mounted in a bore provided in the other end at right angles to the axis of said axial bore; a shaft rotatable and slidable in said axial bore and terminating in a head having a terminal face which is centrally relieved, a V-shaped scroll tooth formed in an annular portion of said terminal face, V-shaped teeth formed on one side of said spindle for cooperation with said scroll tooth, and spring means cooperating between said housing and said head for urging said scroll tooth to engage with said teeth for radial adjustment of said spindle through rotation of said shaft; said shaft being retractable against the urgence of said spring to limit the thrust on said spindle to a predetermined pressure for riding of said scroll tooth over said V-shaped teeth in the event of excessive rotational urgence applied to said shaft, with the scroll tooth reseating and maintaining the maximum limited adjustment with diminished or increased urgence on the shaft.

JOHN W. CROKER.

REFERENCES CITED

The following references are of record in the file of this patent:

UNITED STATES PATENTS

| Number | Name | Date |
|---|---|---|
| 797,354 | Goodsell | Aug. 15, 1905 |
| 841,271 | Rau | Jan. 15, 1907 |
| 1,072,493 | Plant | Sept. 9, 1913 |
| 1,852,485 | Sidon | Apr. 5, 1932 |
| 1,904,143 | Koos | Apr. 18, 1933 |
| 2,059,141 | Pillischafske | Oct. 27, 1936 |